United States Patent

Fleming et al.

[15] 3,665,468

[45] May 23, 1972

[54] RADIO COMMUNICATION SYSTEM

[72] Inventors: James Evans Fleming, Fairfax; Clarence A. Lovell, McLean; James M. Bandle, Alexandria, all of Va.

[73] Assignee: Air Land Systems Co., Fairfax, Va.

[22] Filed: Feb. 25, 1970

[21] Appl. No.: 14,031

[52] U.S. Cl. ............................................. 343/102, 343/105
[51] Int. Cl. ............................................. G01s 1/08
[58] Field of Search ............................................. 343/102, 105

[56] References Cited

UNITED STATES PATENTS 3,117,319 1/1964 Stover ............................................. 343/102

*Primary Examiner*—Benjamin A. Borchelt
*Assistant Examiner*—R. Kinberg
*Attorney*—Dennis O. Kraft and Herbert I. Cantor

[57] ABSTRACT

A novel radio communication system is disclosed, the system having particular applicability and utility as a radio navigation aid. A transmitting means is utilized which, in the preferred inventive embodiment, comprises a plurality or array of antennas disposed in fixed spaced-apart relationship with one another at a known location. One of the transmitting antennas transmits a reference signal, preferably a carrier wave, modulated by a first frequency. The remaining transmitting antennas each transmits a single or double sideband suppressed carrier signal produced by respectively different modulating frequencies for each signal. These different modulating frequencies bear a harmonic or multiple relationship with the first modulating frequency. In the preferred inventive embodiment, each of the remaining transmitting antennas are disposed at different distances from the first or reference transmitting antenna.

The novel system further includes receiver and signal processing means disposed at a location remote from the location of the transmitting means. The receiver means generates from the received reference signal a signal having the frequency and phase of the first modulating signal at the transmitter. From this signal, the other modulating signals coherent with the first signal are derived. The receiver/signal processing means derives from the other received signals the second, third, and fourth modulating signals, and compares the phases of the signals of like frequency. The detected phase differences are indicative of the relative angular direction of the receiver from the transmitting array. In the preferred embodiment, the antennas of the transmitting array are disposed on a line and the phase difference detected in the receiver represents the angular deviation of the receiver from a plane bisecting and perpendicular to the line of transmitting antennas. The accuracy of the system is determined by the maximum spacing between a pair of antennas in the array. The other antennas are used only for resolving ambiguities.

12 Claims, 7 Drawing Figures

RADIO COMMUNICATION SYSTEM

This invention generally relates to radio communication systems and particularly concerns a radio communication system which has specific utility as a navigational aid.

The primary requirement of a navigational system is to fix or determine the position of an object in a known frame of reference. The accuracy of the determination varies with environmental factors but, as a practical matter, the greater the accuracy, the more the value of the system. An important object and feature of the instant invention concerns the accuracy achieved in this respect. Further requirements of a navigational system comprising objects met by the instant invention relate to low cost and reliability which result from use of minimum amounts of electronic equipments to accomplish its purposes.

The instant invention specifically provides a capability whereby a receiver located at an unknown remote position can derive, from signals received from a single transmitting array, the angular direction of the receiver location with respect to the line joining two antennas in the array. A position fix in a two dimensional space requires two transmitting arrays, and in three dimensional space three such arrays are required for a position determination. Thus, the present invention can be conceived as an important element in a navigation system rather than a navigation system itself.

One component of the novel system for accomplishing these and other objects comprises means for generating a plurality of distinctive signals and transmitting each signal from a separate antenna in an array. A reference signal is produced by modulating a carrier with a first modulating signal to produce a carrier and one or two side-bands which are transmitted from a first or reference antenna. A plurality of other information signals are produced by modulating the same carrier with other modulating signals which comprise different harmonics of and are coherent with the first modulating signal. A number of antennas spaced apart in an array are used, one to transmit each of the distinctive signals so produced.

In one preferred embodiment of the invention, the carrier and one sideband is suppressed from each modulator output and a single frequency is transmitted. In another preferred embodiment the carrier is suppressed from each modulator output and the two sideband frequencies are transmitted.

At a remote location another component of the system is disposed and comprises a receiver/signal processor means or unit which receives the composite signal from the transmitter array, derives from the reference signal a signal having the identical frequency and phase of the first modulating signal used to produce the reference signal at the transmitting array, multiplies this signal frequency to produce each of the other modulating signals used at the transmitter, coherent with first derived signal, and derives from the signal components transmitted from the other respective antennas of the transmitting array the respective modulating signals used to produce the transmitted signals. The receiver means compares the phases of signals having like frequencies, resolves the ambiguities of the system, and, in the preferred embodiment, generates an output indicative of the angular direction of the receiver from a plane that bisects the line of the transmitting array and is perpendicular to it. In the respective embodiments of the inventive system, a receiver means suitable for use with the respective transmitted signals is utilized.

The invention will be better understood and further advantageous features and aspects thereof will become apparent from the following detailed description of preferred inventive embodiments, which description refers to the appended sheets of drawings, wherein:

FIG. 1 schematically depicts a transmitting antenna array utilized to radiate signals having various frequency components in accordance with the instant invention;

FIG. 2 schematically depicts, in block diagram format, a transmission means coupled to the antenna array of FIG. 1, which transmission means serves to generate the signals utilized in the instant inventive system;

Figure 3:
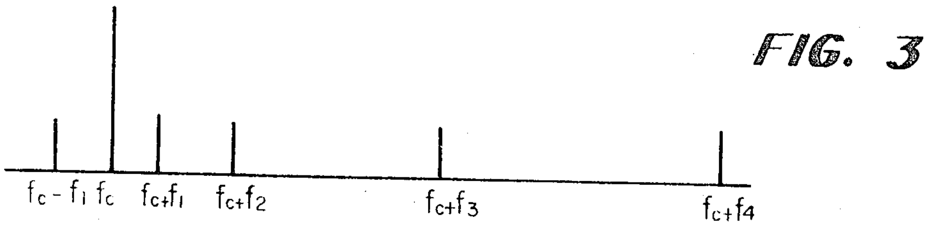
FIG. 3 is a graphical representation of the various frequency components transmitted in accordance with one embodiment of the instant invention utilizing suppressed carrier, single sideband transmission.
Figure 4:
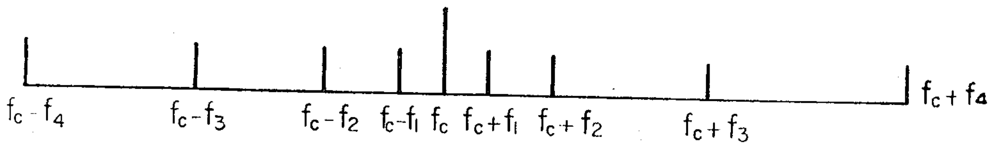
FIG. 4 is a schematic representation of the frequencies transmitted by yet another embodiment of the instant invention utilizing suppressed carrier, double sideband transmitting techniques.
Figure 6:
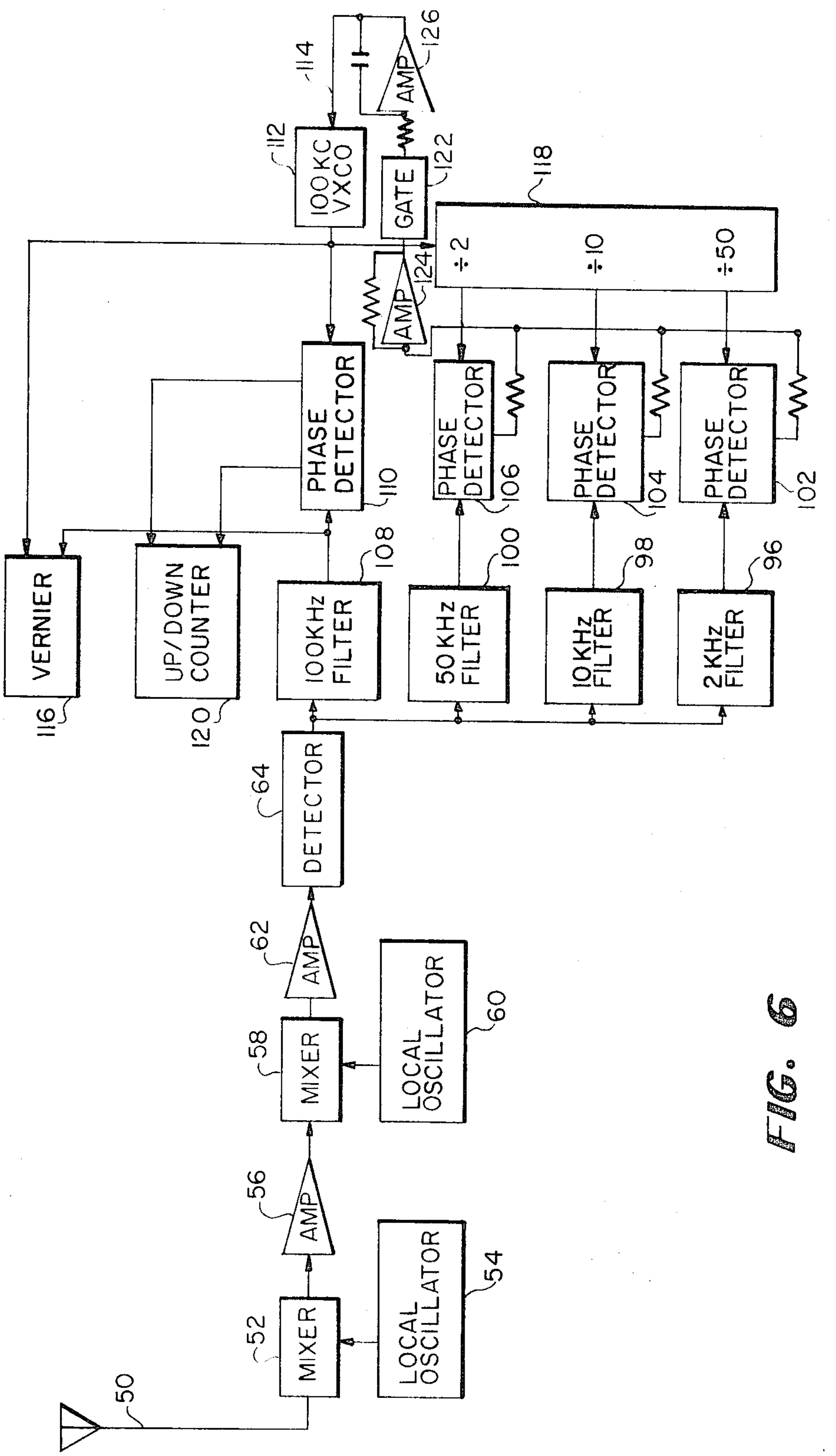
Figure 7:
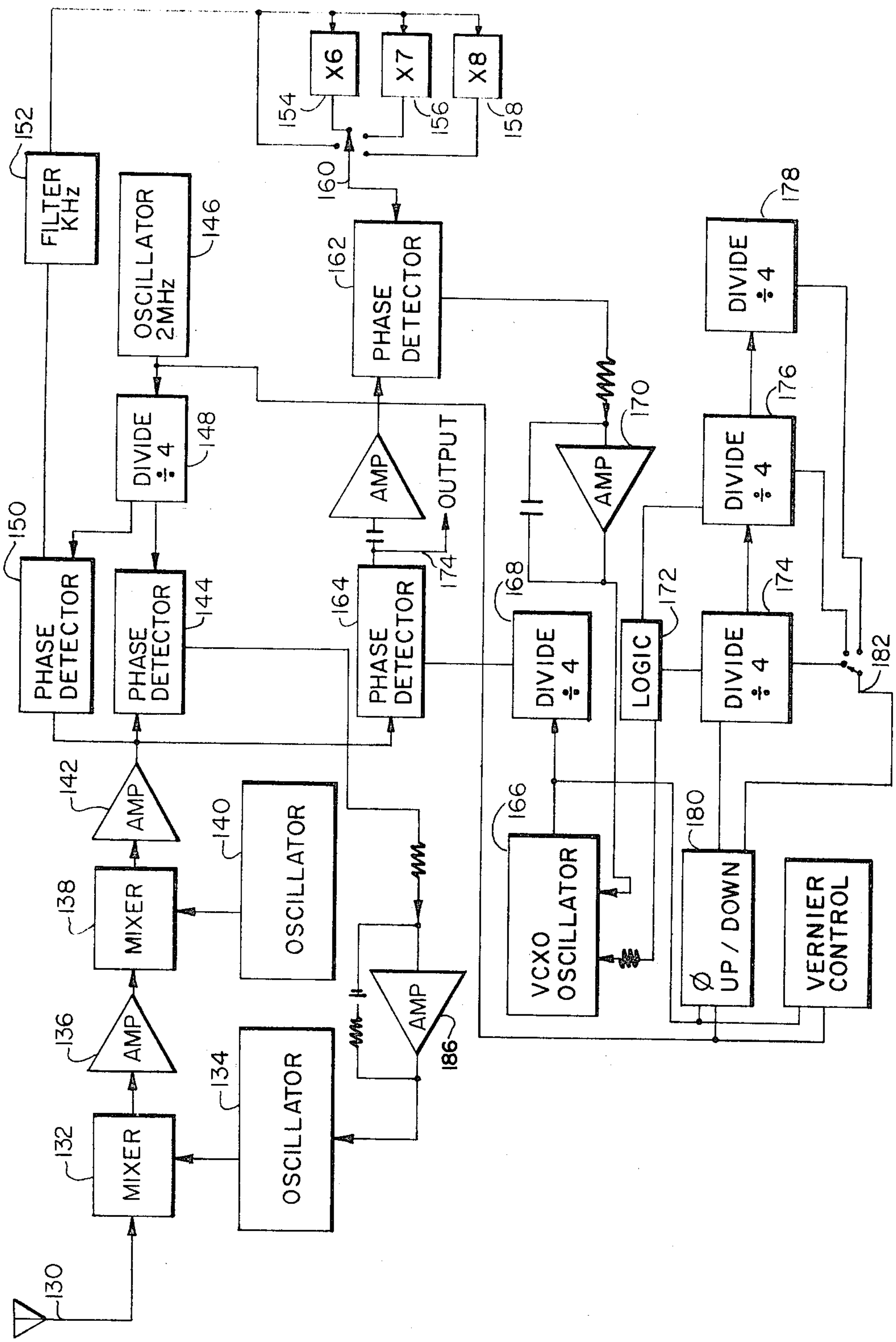

FIG. 6 is a schematic block diagram circuit illustrative of another embodiment of a receiver means constructed in accordance with the instant invention and utilized in conjunction with frequency components transmitted as is depicted in FIG. 3; and FIG. 7 is an electrical schematic block diagram of yet another embodiment of a receiver means constructed in accordance with the instant invention and utilized to receive signals having frequency components such as depicted in FIG. 4.

Figures 1, 2:
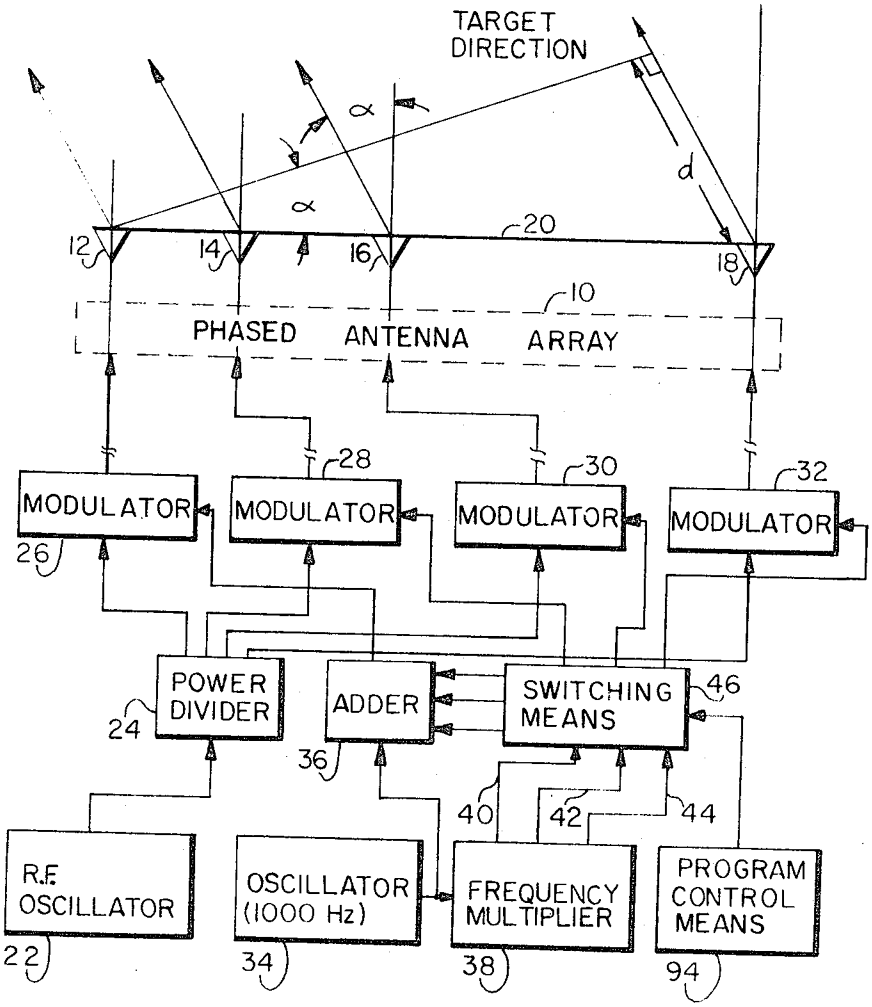

Referring now specifically to the drawings, and particularly to FIG. 1 thereof, a phased transmitting antenna array 10 is depicted contemplated for utilization in the inventive system. The phased transmitting antenna array will be seen to incorporate a plurality of spaced-apart transmitting antennas 12, 14, 16 and 18, respectively. In the preferred inventive embodiment, these transmitting antennas are disposed along a line 20.

As should be apparent, the phased antenna array 10 is similar in its structural configuration to known interferometer-type antenna arrays and primarily differs from the known interferometer-type antenna arrays by the fact that the antennas of the instant invention are utilized to transmit signals, rather than to receive the same. Digressing for a moment at this juncture, some explanation of interferometer measuring techniques is deemed useful so as to ensure a full understanding and appreciation of the instant invention, for, and as will be gleaned from the description hereinbelow, the novel invention makes use of many interferometer principles in deriving the positional information and the angular direction of a remote receiver from the phased antenna array 10.

Now, a conventional interferometer is a receiving apparatus and serves to indicate the angular position of a remote signal source. From a conceptual and basic structural standpoint, a conventional interferometer serves to receive a single radio frequency transmitted from a single remote source but receives this single radio signal through two or more separate antennas disposed in the configuration of an antenna array. The relative phases of the signals received by each of the antennas are compared with one another. Any phase differences detected are effected by differences in distances from the remote signal source to each of the respective receiving antennas. Accordingly, detected phase differences between the received signals in an interferometer can provide a direct indication of the differences in distances travelled by the respective received signals.

As is shown in FIG. 1, the path length difference between a signal that hypothetically would be received by antenna 18 as compared with a signal hypothetically received by antenna 12 emanating from the same remote source is indicated by the reference letter $d$. Since the spacing between antennas 12 and 18 would be known, the determination of the path length difference $d$ along with the known antenna spacing can directly indicate the angular direction $\alpha$ to the signal source indicated by the target lines.

However, the mere provision of two spaced-apart antennas in an interferometer cannot resolve differences in path lengths from the antenna to the remote signal source without some ambiguity which arises whenever the antennas of the interferometer are separated by distances equal to a half wave length or more of the transmitted signal. This is true since the same phase difference between signals hypothetically received at antennas 18 and 12 may be indicated when the remote signal source or target is in different positions. Expressed from a mathematical standpoint, if $d$, i.e., the phase difference, equals $(n + \phi)\lambda$, then $\alpha$, the phase measurement, would be the same for values of $n$ that are equal to 0, 1, 2, etc.

In an interferometer system, these ambiguities may be resolved through the utilization of more than one antenna pair (12, 18) having a range of spacings from one another. For example, two additional antennas such as antennas 14 and 16 could be provided in a conventional interferometer and the spacings between antennas 12 and 14 could be one half wave length of the transmitted frequency, whereas the spacing between antennas 14 and 16 could be 2½ times the transmitted wave lengths, and the spacing between antennas 16 and 18 could be 12½ times the transmitted wave lengths with a phased antenna array configuration such as shown in FIG. 1. With this type of configuration, the accuracy of the angular measurement depends only upon the antenna pair 12 and 18 whereas the other antenna pairs are utilized merely to resolve the above-mentioned ambiguities.

Interferometer techniques, however, are techniques that are related to a system for receiving signals transmitted from a single remote source and, as such, interferometer techniques can be utilized since the same signal frequency is received by all antennas of the antenna array and since the signal received by each of the antennas is known to have been propagated over a particular path from a single source. This discrimination is not possible when an interferometer antenna system is utilized as a transmitting antenna array. As will be appreciated, a receiver that is located at some distant point could not separate from the received composite signals as transmitted by a transmitting antenna array, the component signals transmitted by each of the respective antennas of the array.

Herein, however, lies one of the basic concepts of the instant invention as the invention contemplates the utilization of interferometer-type principles in a transmitting antenna array, which invention solves the problem of discrimination as discussed above by transmitting a different frequency from each antenna of the transmitting antenna array, these frequencies, however, bearing a coherent relationship to each other. Specifically, the novel invention contemplates the utilization of distinctive modulations on a single rf carrier as the signals transmitted by each of the respective antennas of the phased array 10.

Having this background now firmly in mind, reference is again made to FIG. 1 of the drawings. As pointed out above, each of the antennas 12, 14, 16 and 18 are contemplated to transmit a signal each generated from the same carrier frequency, but modulated by different and distinctive frequencies. Further, and assuming that antenna 12 comprises a first or reference antenna, it will transmit the carrier in addition to the modulation products while for each of the antennas 14, 16 and 18 the carriers are suppressed and only the modulation products are transmitted. The modulation frequencies used to produce signals for antennas 14, 16 and 18 respectively are distinct multiples of the reference modulating frequency for the signal transmitted by antenna 12. In one alternative embodiment, each of these multiples may bear the same relationship to one another as do the differences in spacing from each of the antennas 14, 16 and 18, respectively, to the reference antenna 12.

Expressed in a different manner, and for purposes of the ensuing description, let it be assumed that the reference antenna 12 transmits an rf signal modulated by a frequency of 1,000 hz. No coherent relationship need exist between the rf carrier signal and the 1,000 hz. modulating signal and amplitude modulation is contemplated to be utilized such that the composite signal generated by the reference antenna 12 would comprise a carrier with one or two sidebands. Now, a 2,000 hz. tone modulating a suppressed carrier may be utilized as the signal transmitted by antenna 14. The signal transmitted by antenna 16, for example, could comprise the suppressed carrier wave modulated by a frequency of 10,000 hz. and the signal transmitted by antenna 18, for example, could comprise the suppressed carrier signal modulated by a frequency of 50,000 hz. It should be noted that each of the modulating frequencies are coherent with respect to one another.

Referring now to FIG. 2, a transmitting means is depicted, this transmitting means being utilized to drive the phased antenna array 10 of FIG. 1. The transmitter means incorporates an rf oscillator 22 coupled to a power divider 24, the output of which is utilized to drive each of four modulators 26, 28, 30 and 32, respectively, each of the modulators, in turn, being respectively coupled to antennas 12, 14, 16 and 18 of the phased antenna array 10. The signal generated by the rf oscillator 22 comprises the carrier wave for each of the signals transmitted and may have a frequency of 1,000 khz., for example. The modulating frequency for each of the transmitting antennas of the array 10 is produced by an oscillator 34 which may generate a signal having a frequency of 1,000 hz., for example, this signal being utilized as a "reference" tone. Specifically, the 1,000 cycle signal from oscillator 34 passes through an adder means 36 into modulator 26 coupled with a first or reference transmitter 12. Now, modulator 26 is contemplated to comprise a standard AM device in this embodiment and, thus, the signal transmitted by the first or reference antenna 12 of the phased antenna array 10 comprises a standard, double sideband carrier having the frequency of the rf oscillator 22 modulated by the "reference" tone from oscillator 34.

The output from oscillator 34 is also utilized to produce each of the other modulating frequencies or information signals subsequently delivered to the other antennas 14, 16 and 18 of the phased antenna array 10. To achieve this, the oscillator 34 output is sent to a frequency multiplier 38 in which coherent and multiple frequencies of the oscillator frequency are produced. Specifically, the output from frequency multiplier 38 is placed on output lines 40, 42 and 44, which lines respectively will have signal frequencies present of 2,000 hz., 10,000 hz., and 50,000 hz., respectively, these signals being coherent with each other. The output from the frequency multiplier 38 passes through a switching means 46, the function of which will be discussed as the description proceeds, and then to modulator means 28, 30 and 32, and specifically such that the 2,000 cycle signal is presented to modulator 28, the 10,000 cycle signal is presented to modulator 30, and the 50,000 cycle signal is presented to modulator 32. As is indicated, modulators 28, 30 and 32 are respectively coupled to antennas 14, 16 and 18 of the phased array.

As has also been discussed, the signals generated for each of the other antennas 14, 16 and 18 are contemplated in this embodiment to comprise a single sideband with carrier suppressed and modulator means 28, 30 and 32 are accordingly constructed. In another embodiment of the invention, the signals transmitted by antennas 14, 16 and 18 may be of the double sideband carrier suppressed variety and for this case, other suitable modulator means 28, 30 and 32 will be provided.

In the event that the invention is utilized in its one basic embodiment wherein the first or reference transmitter 12 transmits a carrier $f_c$ amplitude modulated in double sideband manner by frequency $f_1$, and that each of the other antennas 14, 16 and 18 transmits a suppressed carrier single sideband signal having respective frequencies $f_c + f_2$, $f_c + f_3$ and $f_c + f_4$, then the composite signal transmitted by the phased antenna array 10 would have the frequency components as indicated in FIG. 3. On the other hand, if the embodiment of the invention is utilized wherein each of the other antennas 14, 16 and 18 transmit suppressed carrier double sideband signals, then the composite output signal from the phased transmitting antenna array 10 would have the components indicated in FIG. 4. It should be understood at this point that the particular form of transmitter means utilized is not critical to the instant invention as all that need be provided is a suitable transmitter means capable of producing a composite output to the phased antenna array having the desired frequency components, such as depicted in either of FIGS. 3 or 4, and such transmitter means will be obvious to those of ordinary skill in the art.

When the composite signals of either FIG. 3 or FIG. 4 are transmitted to a receiver means located at some remote location yet disposed in a plane perpendicular to the line 20 of the transmitting antennas 12, 14, 16 and 18, it would appear to the receiver as though only a single transmitting antenna were present, this antenna transmitting a carrier wave amplitude modulated with the various component frequencies $f_1$, $f_2$, $f_3$ and $f_4$. However, as the position of the remote receiver is moved from this perpendicular, bisecting plane, the phases of the signals $f_c+f_2$, $f_c+f_3$ and $f_c+f_4$, respectively, transmitted by antennas 14, 16 and 18, with respect to the phase of the reference signal transmitted by the reference antenna 12 would shift and it is this phase shift that is utilized in the remote receiver means to determine the locus of possible receiver positions relative to the phased antenna array 10, or more specifically, the angular deviation of the remote receiver position from a plane perpendicular to and bisecting line 20 of the phased antenna array 10. With this operational principle in mind, attention is now directed to the remaining figures of the drawings wherein suitable receiver means for determining the angular deviation of he receiver position are illustrated.

Figure 5:
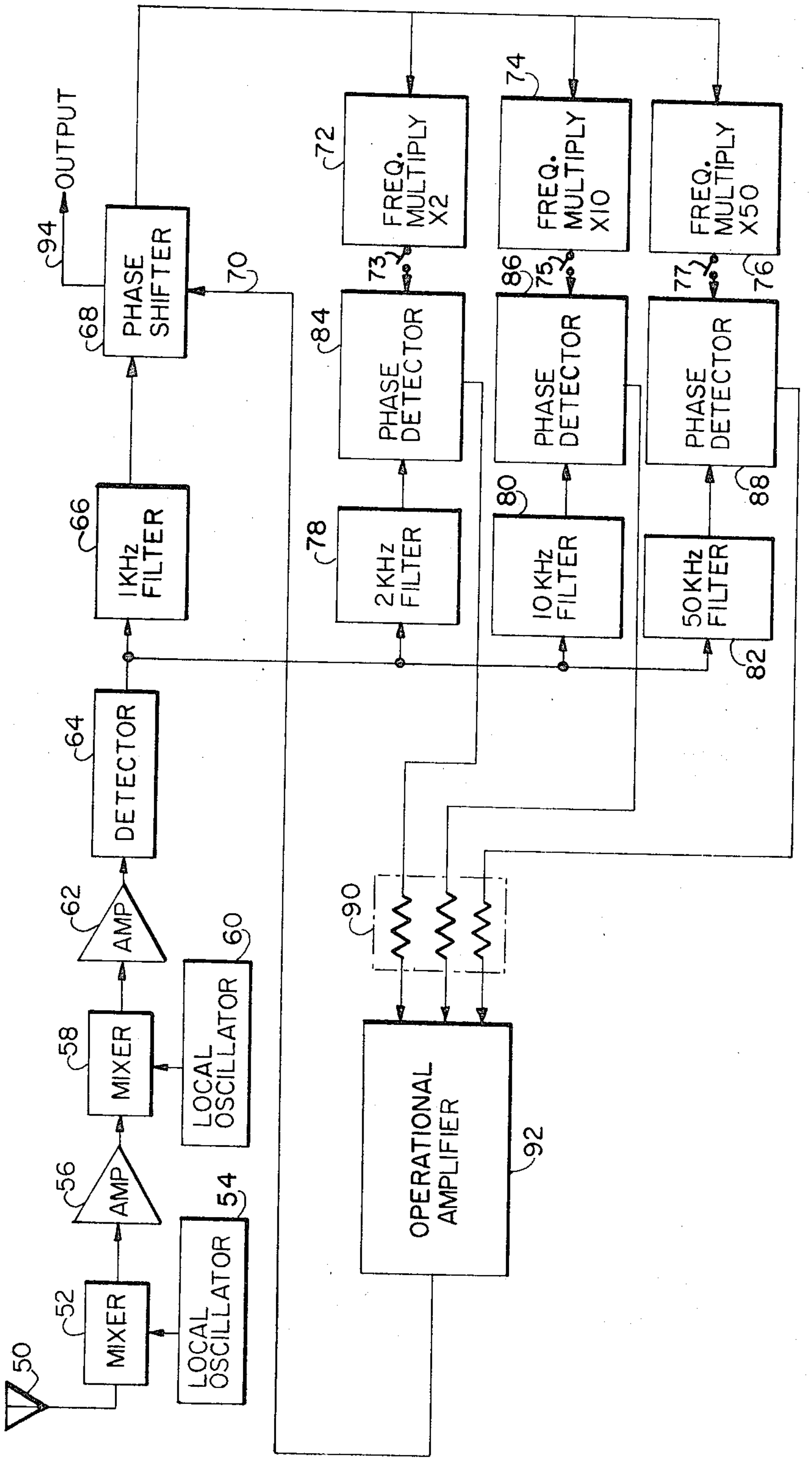
FIG. 5 is a schematic block diagram of a receiving means utilized in accordance with the instant invention and specifically contemplated for use with a transmission means generating frequency components as depicted in FIG. 3.

One such receiver means specifically contemplated for use with a transmitting antenna array generating signal components such as shown in FIG. 3 is illustrated in FIG. 5 and will be seen to comprise a standard AM "front end" including the receiving antenna 50, a first mixer 52 driven by local oscillator 54, an intermediate frequency amplifier 56, the output of which is coupled to a second mixer 58 driven by a second local oscillator 60, an amplifier 62, and an AM detector 64, this receiving apparatus utilizing superheterodyne techniques. The output of the detector 64 comprises frequency components $f_1$, $f_2$, $f_3$ and $f_4$ and, in the example utilized, these components themselves would comprise frequencies of 1,000, 2,000, 10,000 and 50,000 hz., respectively. Frequency component $f_1$ passes through a one KHZ filter 66 and passes through a voltage controlled phase shifter 68 which selectively serves to shift the phase of the 1,000 KHZ signal a predetermined amount in accordance with the voltage signal present on the control line 70 thereof. The 1,000 KHZ signal then passes to various frequency multipliers 72, 74 and 76 wherein the signal is respectively multiplied by 2, by 10, and by 50 with conventional techniques.

The detector 64 is also coupled to filters 78, 80 and 82 which serve to pass only the 2 kilocycle, 10 kilocycle, and 50 kilocycle signals, respectively, corresponding to signals $f_2$, $f_3$ and $f_4$. The output from filters 78, 80 and 82 comprises signals $f_2$, $f_3$ and $f_4$, respectively, as actually received by the receiving apparatus and these outputs form one of the inputs to phase detectors 84, 86 and 88, respectively. The other inputs to the phase detectors 84, 86 and 88 are the signals generated by respective frequency multipliers 72, 74 and 76, these signals having the same respective frequencies as the frequencies of detected signals $f_2$, $f_3$ and $f_4$, but having a phase determined by the phase of the received signal $f_1$ passing through the one KHZ filter 66 and as shifter by the phase shifter 68.

Now, for example, the phase of the signal synthesized from frequency multiplier 76 corresponding to signal having the frequency component $f_4$ is compared with the phase of the signal having frequency component $f_4$ actually received by the receiver means passing through the 50 KHZ filter 82 in the phase detector 88. Any phase difference between the synthesized signal and the actually received signal of the same frequency $f_4$ produces an output from phase detector 88 which output is sent through an appropriate weighting resistor arrangement 90 to an integrating operational amplifier 92. The output from the operational amplifier 92 appears as a voltage on line 70 operating as the controlling influence over a conventional phase shifter 68, the system thus forming a servo loop which will tend to drive the phase shifter 68 to an angular position of its shaft, for example, wherein null phase difference exists. In a sequential fashion, through manual or automatic sequential actuation of switches 73, 75 and 77, for example each of the other received signals having frequency components $f_3$ and $f_2$ are respectively phase compared with the derived or synthesized signal having frequency components $f_3$ and $f_2$ in phase detectors 86 and 84, respectively, the outputs of which phase detectors are also sent through the appropriate weighting resistor arrangement 90 to the operational amplifier 92. In each instance, the system forms a closed servo loop and produces an output voltage in line 70 tending to drive the shaft of phase shifter 68 to a new position, for example to null the outputs of phase detectors 84 and 86. The amount of phase shifting necessary in phase shifter 68, i.e., the total angular movement, for example, is read by any suitable output means 94 such as a dial, coupled to phase shifter 68, this output being indicative of the relative position of the receiver means with respect to the transmitting antenna array and specifically being indicative of the angular deviation of the remote receiver means from a plane bisecting and perpendicular to line 20 interconnecting each of the antennas of the phased antenna array 10.

The overall system, of course, must be calibrated so as to ensure accuracy and, in this respect, the novel system has means to effect the transmission of a calibration signal from the phased antenna array 10, this calibration signal being such that, to the receiver means at the remote location, it would appear that the receiver means is disposed on the plane perpendicular to and bisecting line 20 of the phased antenna array 10, regardless of the actual position of the receiver means. In this fashion, the receiver means can be calibrated or "zeroed in." Referring again to FIG. 2 of the drawings, the means by which this calibration signal is generated will be explained. The various modulating frequencies $f_1$, $f_2$, $f_3$ and $f_4$ are switched from the various antennas 12, 14, 16 and 18 of the transmitting means such that each of these modulating frequencies appear only at the reference transmitting antenna 12. This switching is accomplished by means of the switching means 46, and is controlled as desired by a programmed control means 94 coupled thereto. Accordingly, the output from the frequency multiplier 38 is directly switched back into the adder means 36 through the switching means 46 such that the output from adder 36 comprises all the signals shown in FIG. 3, these signals all being utilized to amplitude modulate the carrier transmitted by antenna 12, this modulation being effected by modulator 26. Since antennas 14, 16 and 18 of the phased antenna array 10 are fed by single sideband suppressed carrier modulators, negligible rf power will be generated by each of the other transmitters when the modulating tones $f_2$, $f_3$ and $f_4$ have been removed in the calibration process.

The remote receiver means accordingly would receive the composite signal transmitted by the single antenna 12 and this signal would be the same as that received by the remote receiver means during normal operation of the phased antenna array 10 if the receiver means was disposed on the plane bisecting and perpendicular to line 20. The remote receiver means would then operate to "null" or zero in the entire system by adjusting the "stand-by" or zero input voltage generated by operational amplifier 92 or, alternatively, by storing the output 94 from phase shifter 68 in a non-illustrated integrating apparatus as an "error" voltage, for example.

The entire system can alternatively be switched from actual measurement modes to calibrate modes and back again on a periodic basis with a pilot tone being generated during each calibrate mode, for example, to distinguish between the various intervals. In this fashion, accuracy of the angle deviation measurement can always be maintained.

Referring now to FIG. 6, an alternative form of a receiver means utilized to receive signals having frequency components such as indicated in FIG. 3, is illustrated, this receiver means being similar in most respects to the receiver means of FIG. 5. The "front end" of the receiver means of FIG. 6 again is a standard superheterodyne receiving apparatus front end containing elements 50 through 64 as discussed with respect to the receiver of FIG. 5, the transmitted modulating frequencies $f_1$, $f_2$, $f_3$ and $f_4$ being taken as the output of the AM detector 64. The mode of operation of the receiver means 56 is similar to that of the receiver means of FIG. 5 in that each of the modulating frequencies $f_2$, $f_3$ and $f_4$ are removed from the detector output 64 by filters 96, 98 and 100, respectively, and are sent to respective phase detectors 102, 104 and 106. In this instance,it is presumed that the reference modulating frequency $f_1$ comprises 100 KHZ, for example, and this reference modulating frequency is removed from the composite detector output 64 by filter 108 and is coupled as one input to a phase detector 110. The other input to phase detector 110 comprises the output of a voltage controlled crystal oscillator 112 constructed to have a normal or reference frequency of 100 KHZ and being controlled by the voltage on control line 114.

The output from the voltage control crystal oscillator 112 provides the second input to phase detector 110 and also provides an input to a vernier means 116 as well as to a divider means 118 as will be described hereinbelow. The output from the 100 KHZ filter 108 provides a second or comparison input to the vernier means 116 whereas the output from the phase detector means 110 is coupled to an up-down counter 120, two outputs from the phase detector means 110 being necessary so as to indicate counts in either the positive or the negative direction, depending on the direction of deviation of the phase of the voltage controlled oscillator 112 output with respect to the phase of the signal from the 100 KHZ filter 108 output.

Now, the receiver of FIG. 6 is initially activated during the calibrate or "zeroeing" operation discussed above with respect to the receiver of FIG. 5. At this time, each of the modulation signals $f_1$, $f_2$, $f_3$ and $f_4$ are applied to the reference antenna 12 of the phased antenna array 10 such that the receiver means receives a signal simulating the signal that the receiver would receive had the receiver been disposed on a plane perpendicular to and traversing line 20 of the phased antenna array. During this calibrate interval, the receiver is placed in a calibrate mode, gate 122 is opened during the presence of the pilot tone allowing the error signals from the output of phase detectors 102, 104 and 106 to pass through integrating amplifiers 124 and 126 to exercise control of the voltage controlled oscillator 112 over its control line 114. The outputs from phase detectors 102, 104 and 106 are representative of the difference in phase between the modulation signals $f_2$, $f_3$ and $f_4$ as actually received compared with the phase of signals $f_2$, $f_3$ and $f_4$ as synthesized by the interaction of the voltage controlled oscillator 112 with the divider means 118.

During the actual calibrate period, gate 122 is opened such that as many calibrated intervals as are necessary can be utilized to null or zero the entire system. When the null or zero point may be manually reached, the up-down counter 120 is re-set to a predetermined count and the gating operation is then reversed such that the gate is opened during the measurement interval in the absence of the pilot tone and closed during the calibrate interval or period. The frequency of voltage control oscillator 112 is then corrected so as to provide an error count. The up-down counter 120 effectively counts the number of cycles either gained or lost by the voltage controlled oscillator 112 with respect to the 100 KHZ signal that is received and passes through the filter 108. This count is obtained from the two outputs of phase detector 110 and, as explained above, two outputs are necessary so as to control the up-down polarity of the counter 120. When null or zero is obtained, the up-down counter 120 would contain or store a count proportional to the size of the angle that the receiver position makes from the plane traversing and perpendicular to line 20 of the phased array. A vernier reading may be obtained in the vernier 116 by measuring the phase displacement between the 100 KHZ signal received at the output of filter means 108 and the 100 KHZ signal generated by the voltage controlled oscillator 112.

With respect to the above-described configuration of the transmitting array 10 of FIG. 1, for example, which array transmits the frequency components of FIG. 3, for example, which components are received by the receiver of FIG. 5, a mathematical analysis can be performed indicating the internal operations and the manner in which the desired angular information can be extracted at the receiver.

Consider two antennas separated by a predetermined number. M, wavelengths of the carrier frequency. The direction perpendicular to the line joining the two antennas will be called the bore sight of the interferometer array. Let one antenna be called the reference antenna $S_r$ and the other be called $S_2$.

Let $\omega_c = 2\pi f_c$, $f_c$ = carrier frequency $\omega_m = 2\pi f_m$, $f_m$ = modulating frequency at $A_r$ $\phi$ = differential difference phase from respective transmitting antenna to receiver in radians at $\omega_c$, receiver near the bore sight.

$N\omega_m$ = radian frequency of modulation at $S_2$ $A_c$ = amplitude of carrier $M_a$ = modulation amplitude The signal broadcast at $A_r$ contains three frequencies, $f_c$, $f_c + f_m$, and $f_c - f_m$; that is, $$E_r = A_c \text{ Cos } \omega_c t + \tfrac{1}{2} A_c M_a \text{ Cos}(\omega_c + \omega_m)t + \tfrac{1}{2} A_c M_a \text{Cos}(\omega_c - \omega_m)t$$

The signal transmitted from $S_2$ has the carrier and lower sideband suppressed, hence, $$E_2 = \tfrac{1}{2} A_c M_a \text{Cos } (\omega_c t + \omega_m t + \phi)$$

The received signal is the linear sum of these signals and the detected signal is $$E = (E_r + E_2) \text{ Cos}\omega_c t$$

We consider here only the useful components of the detected signal and call it $E_o$.

$$E_o = \tfrac{1}{2} A_c M_a \text{Cos } (\omega_c + \omega_m)t + \tfrac{1}{2} A_c M_a \text{Cos } (\omega_c t + N\omega_m t + \phi)$$

$$E_o = \tfrac{1}{2} A_c M_a [\text{Cos } \omega_m t + \text{Cos } (N\omega_m t + \phi)]$$

The reference modulation component ($\text{Cos}\omega_m t$) is frequency multiplied by $N$ to produce $\text{Cos } N\omega_m t$. This new component is multiplied in a phase detector with the received component from $S_2$, $\text{Cos } (N\omega_m t + \phi)$ to produce the information term.

Ignoring amplitudes, the output of the phase detector is $$E_d = \text{Cos } N\omega_m t \, [Cos\ (N\omega_m t + \phi)] = \tfrac{1}{2} [\text{Cos } (2N\omega_m t + \phi) + \text{Cos } \phi]$$

The DC component $\text{Cos } \phi$ is the desired information.

The one component which would have cancelled the $\text{Cos } \phi$ term is the lower sideband from the modulator at $S_2$ and it has been eliminated to prevent such a cancellation. None of the other terms omitted from this analysis cancels the information term in the detected signal.

The above discussion and analysis has assumed that the phased antenna array 10 transmits a plurality of signals having frequency components such as indicated in FIG. 3. However, and as discussed, the novel transmitting means of the instant invention can utilize double sideband suppressed carrier modulations for each of the antennas 14, 16 and 18, of the phased antenna array, and in this manner, generate a composite signal having the frequency components of FIG. 4. With this inventive embodiment, a modification must be made in the receiver assume of FIGS. 5 and 6 and, in this respect, attention is now directed to the receiver means of FIG. 7 particularly constructed in accordance with the instant invention to operate with frequency components such as are presented in FIG. 4.

Referring now to FIG. 7, the novel receiver will be seen to incorporate a standard so-called "phase-lock" front end comprising antenna 130, mixer 132 coupled to a local oscillator 134, an amplifier stage 136, a second mixer 138 coupled to a local oscillator 140, and an amplifier 142. The output from amplifier 142 comprises one input to a phase detector 144, the other input to the phase detector being provided by a two megahertz oscillator 146 coupled through a divider 148 which produces an output frequency of 500 kilocycles. In this instance, we must assume a 500 kilocycle intermediate frequency. Any difference between phase of the signal generated by the oscillator 146 and subsequently divided in the divider means 148 from the phase of the carrier signal received by antenna 130 provides an "error" output fed through operational amplifier 186 so as to control the frequency or phase of local oscillator 134. In this fashion, oscillator 146 is "locked" to the received carrier signal.

As is shown, the output from the divider means 148, i.e., a 500 kilocycle signal phase locked to the phase of the signal received by antenna 130, forms one input to phase detector 150, the other input to the phase detector 150 being the composite signal as received by the receiver means and as amplified by amplifier 142. The output of phase detector 150 is then filtered in filter means 152 so as to recover a 5 KHZ "reference" signal which reference signal is utilized to reconstruct the other modulating frequencies, i.e., $f_2$, $f_3$ and $f_4$ . Specifically, the output of filter 152 is fed either intact or as multiplied by multipliers 154, 156 and 158, to a multi-position switch 160. Depending on the position of switch 160, the input to a phase detector 162 will either comprise a 5 KHZ signal, a 30 KHZ signal, a 35 KHZ signal, or a 40 KHZ signal, these inputs being utilized to "synthesize" additional signals much in the fashion discussed with respect to receivers of FIGS. 5 and 6.

Specifically, a phase detector 164 is provided with two inputs, one input being derived from the received,intermediate frequency signal from amplifier 142, the other input being derived from a voltage controlled oscillator 166, coupled through a divider 168 which serves to divide the frequency of oscillator 166 by four. The oscillator frequency is itself controlled by the output of phase detector 162 through operational amplifier and high pass filter 170 as well as the output of a logic circuit means 172.

The output from phase detector 164 comprises an amplitude proportional to the cosine of the angular difference between the phase angle of a reconstructed carrier corresponding to the suppressed carrier had it been transmitted of one of the modulation frequencies $f_2$, $f_3$ and $f_4$ ,and the phase angle of the carrier actually transmitted. This amplitude is taken as the output of the receiver device on line 174. When the angular difference between the angle of the synthesized or reconstructed carrier and the angle of the carrier transmitted is 90°, the output on line 174 is 0. As this phase varies to either side of 90°, the signal would increase and a 180° phase shift would occur about the null point. The error signal utilized to control this loop is contained in the amplitude and with the 180° phase reversal. As is shown, the phase detector 162 functions as a synchronous detector and is utilized to convert the error signal from phase detector 164 into bipolar DC, which DC signal drives the voltage controlled oscillator 166 through the amplifier 170. The utilization of a single discrete frequency as selected by the position of the multi-position switch 160 as well as the utilization of a low cut-off frequency in the feedback amplifier 170 serves to separate the desired modulation tone from the composite received signal.

In effect, then, rather than directly comparing the modulating frequencies $f_2$ , $f_3$ and $f_4$ as received by signals that are synthesized to have the same frequencies, the receiver means of FIG. 7 utilizes the reference modulation tone $f_1$ as a demodulating signal in the synthesization or reconstruction of each of the respective suppressed carriers of the modulating frequencies $f_2$, $f_3$ and $f_4$ . This operation is possible since, as pointed out at the outset of this description, double sideband suppressed carriers comprise the type of signal generated by the antenna array 10 in this alternative though preferred inventive embodiment.

The overall operation of the receiver means of FIG. 7 is such that a particular reference tone is selected by the multi-selector switch 160 and a carrier insertion into phase detector 164 is allowed to stabilize. The base or nominal frequency of voltage controlled oscillator 166 is provided by logic circuit means 172 operable through a plurality of dividers 174, 176 and 178, which dividers are coupled to an up-down counter 180 as selectively provided by multi-position switch 182, ganged to the switch 160. The cycle shift between the "zero" standard and the voltage controlled oscillator 166 is counted in the units counter which, in this instance, comprises divider 178. Now, the second reference tone is selected by multi-position switch 160 and the carrier insertion loop is again allowed to stabilize, any cycle shift between the new zero standard and the voltage controlled oscillator 166 being counted in the 4's counter, i.e., divider means 176. Lastly, the remaining reference signal is selected by multi-position switch 160 and the loop again allowed to stabilize, any cycle shift occurring being counted in the 16's counter. The entire process repeats itself and the "reference" angle is constantly updated.

As was similarly done with respect to a receiver means designed to operate with transmitted frequencies of FIG. 3, a mathematical analysis can be made of the operation of the receiver means of FIG. 7, this receiver means being designed to operate with frequency components of FIG. 4. In this double sideband, suppressed carrier instance, the following relationships hold true:

Carrier $\omega t$

Modulation $\rho t$

Sidebands $\sin(\omega+\rho)t+\sin(\omega-\rho)t$

Injected Carrier $\sin(\omega t+\phi)$

Output of product and phase detector 164 $e=\sin(\omega t+\phi)[\sin(\omega+\rho)t+\sin(\omega-\rho)t]$ $e=\cos(\omega t+\phi-\omega t+\rho t)-\cos(\omega t+\phi+\omega t+\rho t)+\cos(\rho t+\phi-\omega t-\rho t)-\cos(\omega t+\phi+\omega t-\rho t)\cos(\rho t+\phi)-\cos(2\omega t+\rho t+\phi)+\cos(-\rho t+\phi)-\cos(2\omega t-\rho t+\phi)$ after L.P. filtering $e=\cos(\rho t+\phi)+\cos(-\rho t+\phi)$ $e=\cos\rho t\ \mathrm{Cos}\ \phi-\sin\rho t\sin\phi+\cos\rho t\ \mathrm{Cos}\ \phi+\sin\rho t\sin\phi$ $e=2\cos\rho t\cos\phi$ let $\phi=0° e=2\cos\rho t$ let $\phi\ 90°\ e=0$ As should now be apparent, the objects initially set forth at the outset to the specification, have been successfully achieved. ACCORDINGLY,

What is claimed is

1. A radio communication system comprising a transmitting antenna array defining at least first and second spaced-apart antennas, transmission means coupled to said antenna array such that said first antenna transmits a reference wave comprising a carrier modulated by a first modulating signal, and such that said second antenna transmits a wave comprising a carrier modulated by a second modulating signal having a frequency that is a given multiple of the frequency of said first modulating signal; remote receiver means for receiving the composite transmitted signal, said receiver means including comparator means which multiplies said first signal by said given multiple to produce a third signal having the same frequency as the frequency of said second signal, and which compares the phase of said third signal with the phase of said second signal to generate an output indicative of the locus of receiver positions with respect to the location of the transmitting antenna array.

2. A system as defined in claim 1, including additional spaced-apart transmitting antennas, each transmitting a wave comprising respectively different modulating signals, each said different modulating signal comprising a frequency having a different multiple of said first modulating frequency, said comparator means of said receiver selectively multiplying said first signal by each said different multiple to respectively produce a plurality of third signals each having the same frequency as the frequency of a respective different modulating signal, each said third signal being phase-compared with the phase of said respective different modulating signal to generate said output.

3. A system as defined in claim 2, wherein said reference wave comprises an amplitude modulated carrier and wherein said other transmitted waves comprise suppressed carrier single side-band amplitude modulated signals.

4. A system as defined in claim 2, wherein said second and each said additional transmitting antenna is disposed at different distances from said first transmitting antenna, said distances bearing the same respective relationship with one another as the relationship between the different multiples of the transmitted modulating frequencies.

5. A radio communication system as defined in claim 2, wherein the output of said receiver means approximates the angular deviation of the location of said receiver means from a plane bisecting and perpendicular to a line between two of said transmitting antennas.

6. A radio communication system as defined in claim 2, further including calibration means associated with said transmission means, such that said first transmitting antenna selectively and simultaneously transmits all of said signals, the other transmitting antennas being disabled.

7. A radio communication system comprising a plurality of antenna means, one of said antenna means transmitting a reference signal comprising a modulated carrier, each of the other antenna means transmitting a signal having respectively different modulation frequency components, a receiver means for said transmitted signals disposed at a remote location, said receiver means including means for detecting said reference signal and for synthesizing each of said respectively different modulation frequency components therefrom, said receiver means further including comparator means for selectively comparing the phase of said synthesized signals with the phase of the transmitted signals, said receiver means generating an output from the compared phase differentials representative of the locus of the receiver positions with respect to said plurality of antenna means.

8. A radio communication system as defined in claim 7, wherein each of said other antenna means transmits a suppressed carrier single sideband signal.

9. A radio communication system comprising:

a transmitter means including first transmitting antenna means for generating and transmitting a first signal having a first modulation frequency component, and additional transmitting antenna means for generating and transmitting other signals having respectively different modulation frequency components each being a multiple of said first modulation frequency component; and receiver means for receiving all said transmitted signals, said receiver means including means for synthesizing from the received first signal additional signals having frequency components that are the same as each of said other transmitted signals, and means for comparing the phase of said synthesized signals with the phase of said other transmitted signals as received.

10. A radio communication system as defined in claim 9, wherein said first signal comprises an amplitude modulated carrier and wherein said other signals comprise single sideband amplitude modulated suppressed carriers.

11. A radio communication system as defined in claim 9, wherein each said additional transmitting antenna is disposed at a different distance from said first transmitting antenna, said distances bearing the same respective relationship with one another as the relationship between the different multiples of the transmitted modulation frequency components.

12. A radio communication system comprising:

a transmitting array means including a first antenna means for transmitting a first signal synthesized from at least one reference signal and a carrier, and a second antenna means for transmitting a second signal synthesized from an information signal and said carrier; and receiver means for receiving the composite transmitted signals and detecting said reference signal and said information signal, means for synthesizing from said reference signal an additional signal having the same frequency as said information signal, and means for comparing the phase of said information signal and said additional signal of like frequency, whereby the bearing of the line of position of the receiver with respect to the transmitting array may be determined.

* * * * *